Oct. 9, 1956
J. W. SMITH
2,765,822
CHAIN SAW CART
Filed Nov. 6, 1953
3 Sheets-Sheet 1
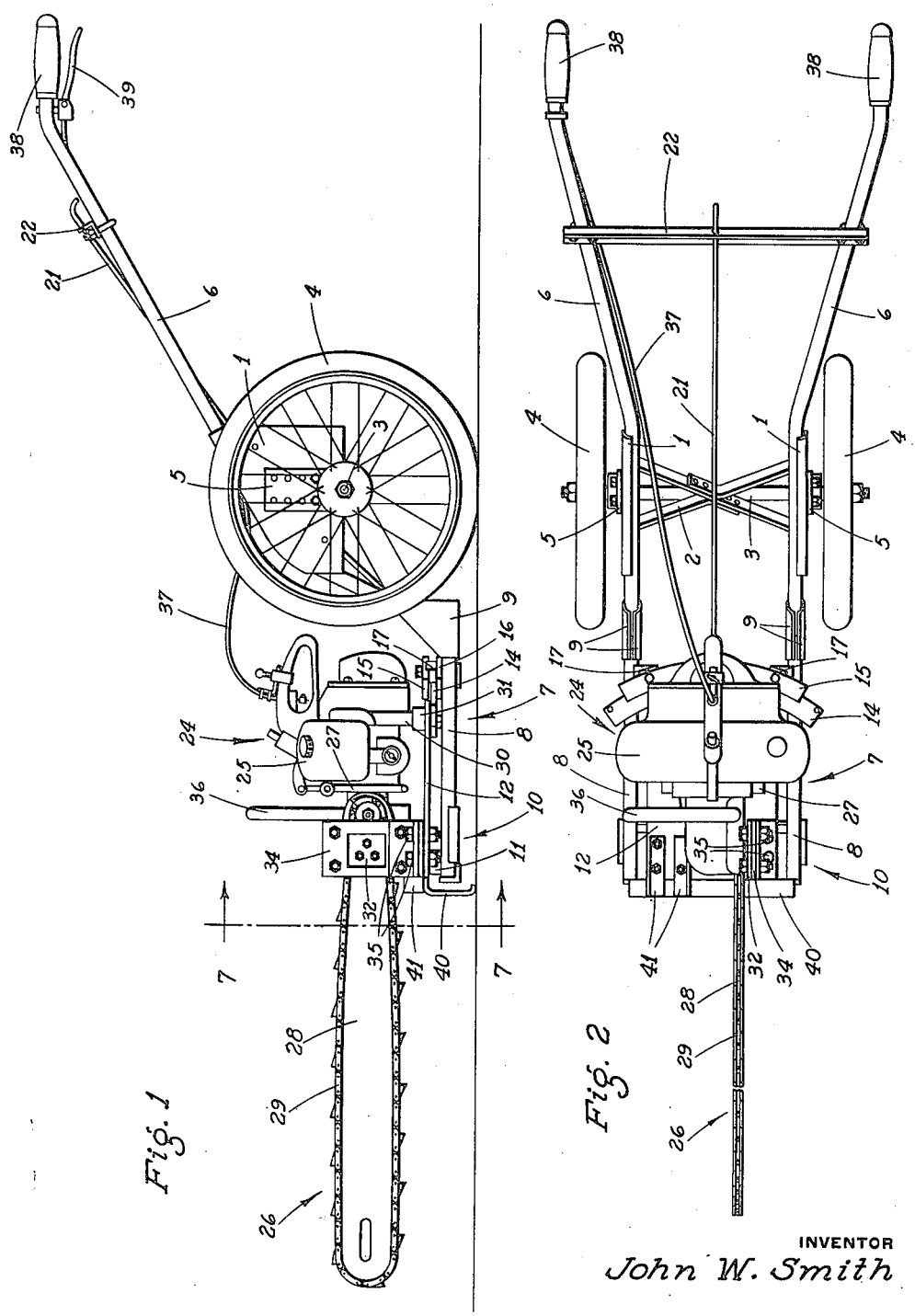
INVENTOR
John W. Smith
BY Webster & Webster
ATTORNEYS

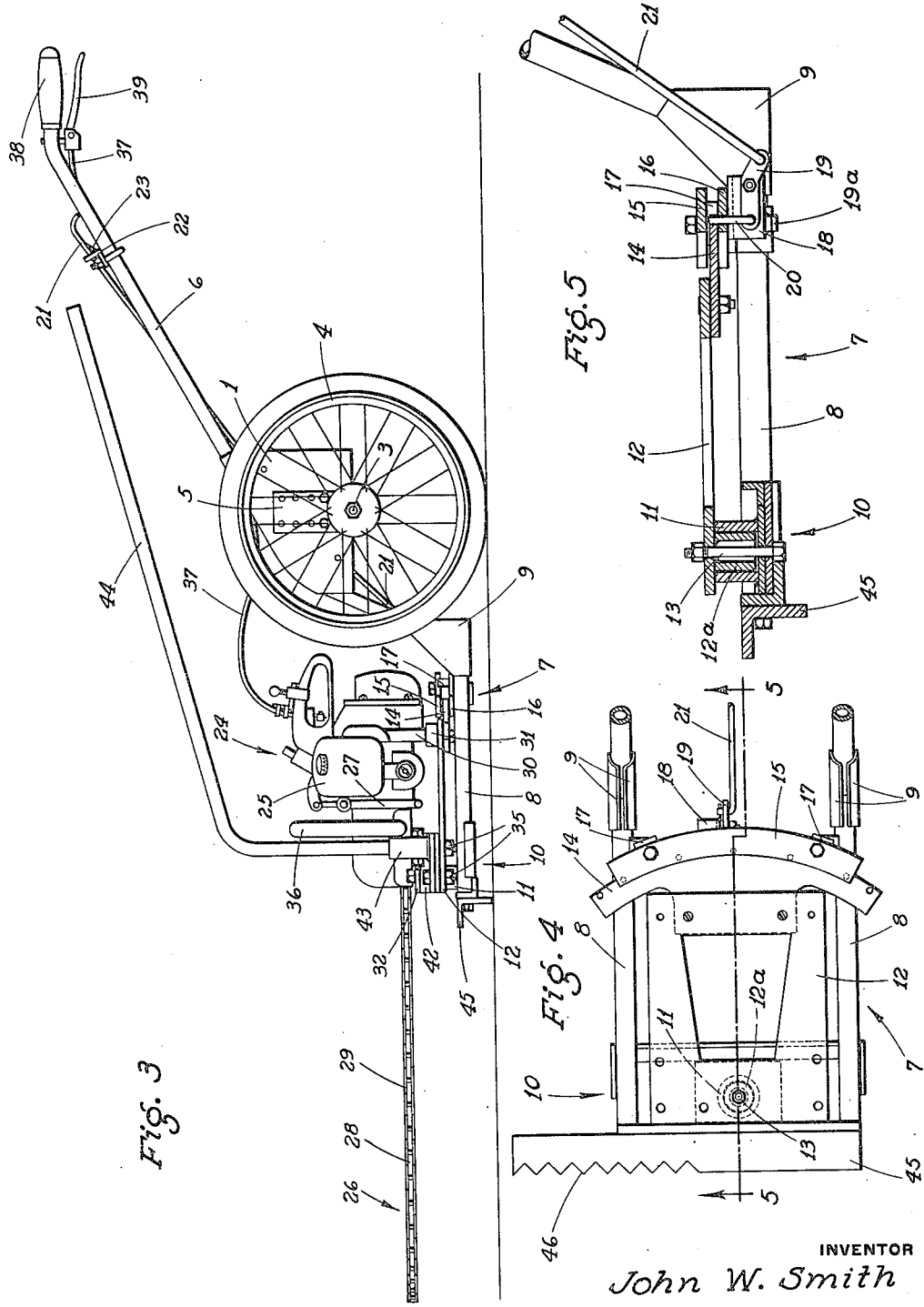

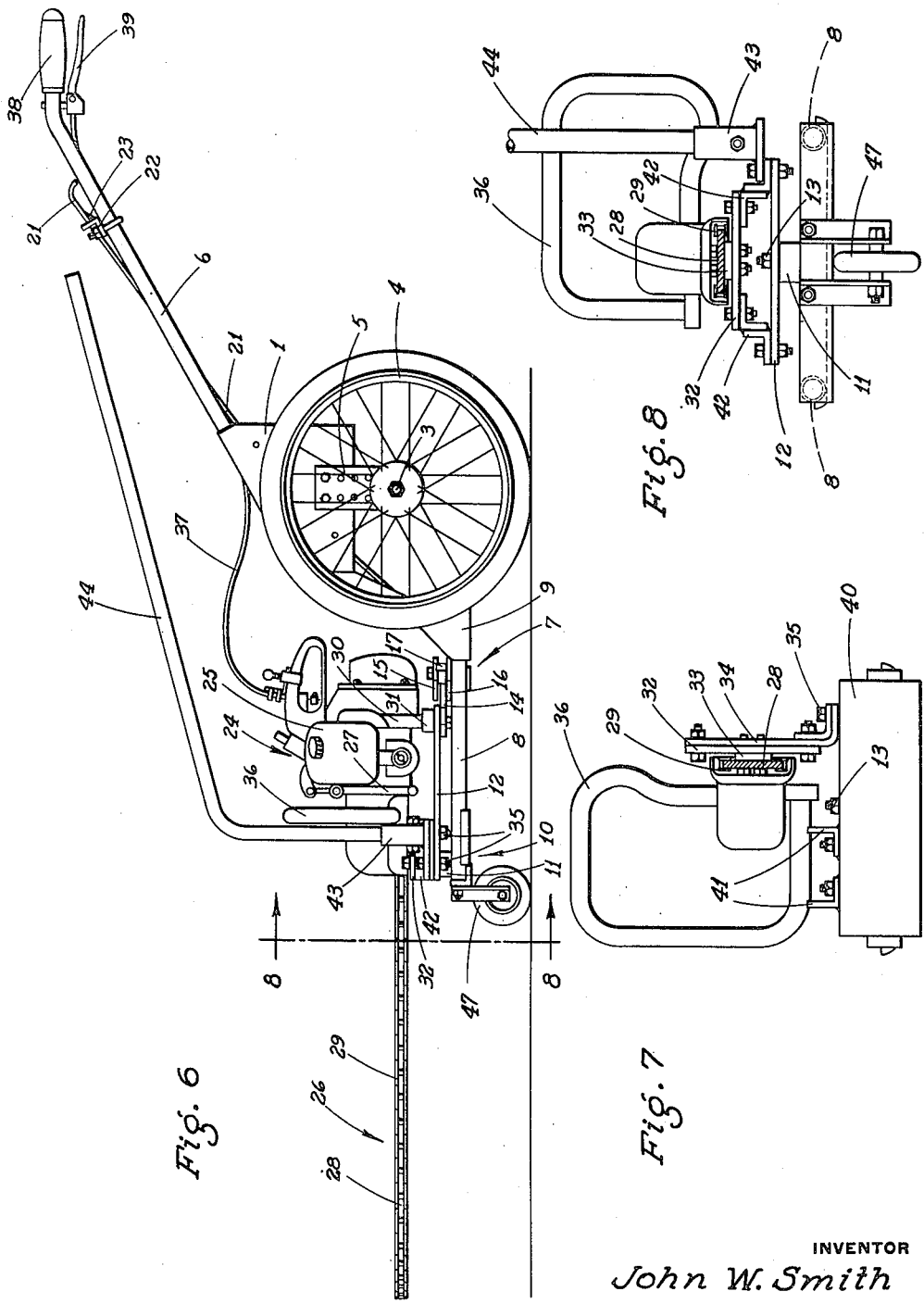

United States Patent Office 2,765,822
Patented Oct. 9, 1956

2,765,822

CHAIN SAW CART

John W. Smith, Grass Valley, Calif.

Application November 6, 1953, Serial No. 390,463

1 Claim. (Cl. 143—32)

The present invention is directed to, and it is a major object to provide, a novel cart for supporting, and maneuvering for use, a unitary motor driven, endless chain saw of the type which is normally hand carried and manipulated; the purpose of the cart being to facilitate the use of such a saw, and to reduce the labor required of the operator.

An additional important object of the invention is to provide a chain saw cart which is adapted for mounting of the saw in position for adjustment of the sawing chain unit to accomplish horizontal or vertical cutting, selectively; the horizontal setting being employed for felling trees, and for stump and brush cutting, while the vertical setting is employed for bucking logs into short lengths.

Another important object of the invention is to provide a chain saw cart, as above, which includes a low level platform on which the chain saw is mounted with the sawing chain unit projecting forwardly for use; such platform being manually turnable, by a tiller arm, about an upstanding axis so as to permit of swinging of the sawing chain unit laterally to and fro when set for horizontal cutting, and upon release of a holding latch which is employed when the sawing chain unit is set for vertical cutting.

A further object of the invention is to provide a chain saw cart, as in the preceding paragraph, which includes a novel mount and guide, together with an effective releasable latch, for the turnable platform on which the chain saw is mounted.

A still further object of the invention is to provide a cart, for the purpose described, which is of push type, including rearwardly and upwardly inclined handles for manual engagement by the operator, a forwardly projecting low level frame which carries the releasably latched turnable platform on which the chain saw is mounted, and transversely spaced wheels supporting the entire assembly on opposite sides and intermediate the ends thereof.

It is also an object of the invention to provide a chain saw cart which is designed for ease and economy of manufacture, and one which is adapted for use with a conventional type of portable chain saw.

Still another object of the invention is to provide a practical and reliable chain saw cart, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of the cart with a chain saw mounted thereon for use; the projecting sawing chain unit being shown adjusted for vertical cutting.

Fig. 2 is a plan view of the same.

Fig. 3 is a view similar to Fig. 1, but shows the projecting sawing chain unit as adjusted for horizontal cutting; the log bumper included on the device in Fig. 1 here being substituted by a ground engaging foot and brush holding bar.

Fig. 4 is an enlarged fragmentary plan view, with the chain saw detached, of the turnable platform and its mounting and guide arrangement; the view including the ground engaging foot and brush holding bar, as in Fig. 3.

Fig. 5 is a longitudinal sectional elevation on line 5—5 of Fig. 4.

Fig. 6 is a view similar to Fig. 3, except that the ground engaging foot and brush holding bar is substituted by a central forward wheel, and the main wheels of the cart are adjusted to dispose the projecting sawing chain unit in a higher plane.

Fig. 7 is a transverse vertical section on line 7—7 of Fig. 1.

Fig. 8 is a transverse vertical section on line 8—8 of Fig. 6.

Referring now more particularly to the drawings, and to the characters of reference marked thereon, the cart comprises a pair of upstanding, transversely spaced side plates 1 secured by an X-frame 2. An axle 3 extends below the side plates 1, and at the ends carries ground engaging wheels 4; the axle being vertically adjustably secured to the side plates 1 by brackets 5.

A pair of transversely spaced handles 6 extend from rearwardly of the wheels 4 at a forward and downward incline; such handles being connected to the side plates 1 and thence projecting downwardly at a somewhat sharper incline to connection with a low-level, forwardly projecting frame 7 of generally rectangular configuration in plan.

The forwardly projecting low-level frame 7 includes longitudinal side bars 8 secured at their rear ends in connection with the lower ends of the handles 6 by means of gusset plates 9.

A front cross structure 10 is included in the frame 7 and supports, centrally of the sides thereof, a relatively short upstanding bearing neck 11 in fixed position.

A turnable platform 12 is disposed above the frame 7 and at the front, and centrally of its sides, such platform seats on the bearing neck 7, being pivotally secured in connection therewith by means of sleeve 12a turnable in said neck, and a pivot bolt 13 which extends through the neck and sleeve and connects the platform 12 and the front cross structure 10.

At its rear end the platform 12 is fitted with an arcuate segmental guide 14 which runs between arcuate upper and lower guide plates 15 and 16 maintained separated by a spacer 17; the plates 15 and 16, together with the spacer 17, being rigidly secured in connection with and spanning between the side bars 8 to provide the rear cross structure of the frame 7.

The platform 12 is releasably latched against rotative motion by means of the following:

A rigid ear 18 is fixed to and depends from the lower guide plate 16 intermediate the ends thereof, and a bellcrank lever 19 is pivoted on a transverse axis in connection with ear 18; there being a latch pin 20 pivoted to the forward end of the bellcrank lever 19 and projecting upwardly in slidable relation through a hole in the lower guide plate 16 and engaging in a selected one of a row of holes which exist in the guide 14 concentric to the bolt 13.

A push-pull rod 21 is pivotally connected at its lower end to the rear end of the bellcrank lever 19, and thence extends upwardly and projects with limited vertical play through a cross bar 22 secured to and spanning between the handles 6; such rod having a catch 23 thereon adapted to releasably engage against the rear side of the cross bar 22 when said rod 21 is pulled rearwardly to release the latch pin 20. It will thus be recognized that said latch pin 20 can be set in a holding position in engagement with the platform 12, or set in a position released from the latter, with the lever 19 abutting a stop 19a.

The numeral 24 indicates generally a chain saw of the type which includes an engine 25 and a forwardly projecting sawing chain unit 26; the latter being secured to the engine 25 by a mount 27, by means of which said sawing chain unit 26 may be set for vertical cuts or for horizontal cuts. The sawing chain unit 26 includes a forwardly projecting elongated guide 28 on which the sawing chain 29 runs in guided relation.

The chain saw 24 is supported from the cart as follows:

The engine 25 rests on the platform 12; the legs 30 of said engine bearing on pads 31 carried by said platform 12. The guide 28 is fitted, adjacent but short of its rear end, with an adapter plate 32 which faces the guide 28, being secured thereto by bolting, as shown, and with a spacer 33 between plate 32 and guide 28 in order to maintain proper clearance relative to the chain 29.

When the sawing chain unit 26 is adjusted for vertical cutting, as in Figs. 1, 2, and 7, the adapter plate is secured to an upstanding attachment bracket 34 bolted, as at 35, to the platform 12. In this position of the sawing chain unit 26 the loop handle 36 which the chain saw conventionally includes, is disposed as shown in Fig. 7.

The speed of the engine 25 is regulated by a sheathed control wire 37 which extends from said engine 25 upwardly to a point adjacent one of the hand grips 38 on the handles 6; said sheathed control wire 37 being worked from the adjacent grip by means of a throttle lever 39.

In use of the cart with the chain saw 24 mounted thereon, and with the sawing chain unit 26 set for vertical cutting, as in Figs. 1, 2, and 7, the operator manipulates the cart in the following manner:

With this type of setting the cart and chain saw combination is used for bucking logs; the cart being handle-manipulated so as to first disposed the sawing chain unit 26 over the log, with a transverse bumper 40, which is disposed at the front of the platform 12, in engagement with the adjacent face of said log. With the substantial weight which is then imposed on the sawing chain unit 26 the latter is permitted to cut downwardly through the log; the assembly of the cart, together with the chain saw 24; swinging about the axle 3. In this manner the cart is employed in a convenient and facile manner to cut or buck logs.

The transverse bumper 40 is detachably secured to the platform 12 by horizontal rearwardly projecting attachment fingers 41 bolted to said platform, as shown.

For felling trees, or for cutting brush or the like, the projecting sawing chain unit 26 is adjusted, by the mount 27, to a horizontal position, as in Figs. 3 and 8; the attachment bracket 34 being removed and other attachment brackets 42 are employed to then secure the now horizontal adapter plate 32 to the platform 12. Additionally, an upwardly opening socket 43 is secured to the platform 12 adjacent the forward corner, and a tiller arm 44 fixed in said socket extends first upwardly and thence rearwardly to a termination above the handles 6, and at a point within easy reach of the operator who stands behid the cart hand-engaging the grips 38.

Additionally, the latch pin 20 is retracted by the rod 21 and latched in said retracted position by the catch 23, so that the platform 12 may be turned about the pivot bolt 13 by manipulation of the tiller arm 44, by the operator, at its rear end.

To accomplish a horizontal cut, either on a tree or brush, the operator first moves the cart to a position with the projecting sawing chain unit 26 disposed closely adjacent said tree or brush, and then swings the tiller arm 44 so that the platform 12 turns about its axis and correspondingly swings the projecting sawing chain unit 26 into cutting relation with said tree or brush. The operation is thus accomplished easily and without any heavy manual load or strain on the operator.

When used for tree felling or brush cutting it is preferred that the transverse bumper 40, as in Fig. 1, be detached from the platform 12, and a transverse ground engaging foot and brush holding bar 45 is bolted to the to the front of the frame 7 in the manner shown in Figs. 3 and 4. The bar 45 is an angle iron disposed so that one flange depends as a ground engaging foot and the other flange projects forwardly; the latter being serrated, as at 46.

When the cart is disposed adjacent the brush or tree to be cut, the bar 45 is lowered into ground engagement and at the same time the serrated portion 46 bites into the brush or tree in holding relation. This assures of sufficient resistance—for effective cutting—to the projecting sawing chain unit 26 when it is swung into the brush or tree to cut the same.

However, under all conditions the ground engaging foot and brush holding bar 45 is not needed, and in lieu thereof the frame 7 may be fitted, at the front, with a centrally disposed, relatively small-diameter ground engaging wheel unit 47, as shown in Figs. 6 and 8; such wheel unit being bolted to the front of the frame 7. This wheel unit 47 is used mainly in instances where the projecting sawing chain unit 26 is in a horizontal cutting position, and when it is desired to accomplish a cut some distance above ground. To compensate for the height of the wheel unit 47 the brackets 5 are vertically adjusted on the side plates 1 to the extent necessary to level, or to set to any predetermined angle, the projecting sawing chain unit 26. Such position of vertical adjustment of the brackets 5, to relatively lower the wheels 4, is shown in Fig. 6.

With the above described cart a chain saw, rather than being hand-supported—which is very tiring to the operator—is cart-supported from the ground, yet can be easily manipulated by the operator, both for vertical or horizontal cutting, by the projecting sawing chain unit 26; the latter being adjustable between vertical and horizontal positions by the simple interchange of the brackets 34 and 42, together with rotary adjustment of the mount 27.

The operator experiences no difficulty in rocking the entire assembly about the axle 3 for making vertical cuts, or in swinging the platform 12 about the pivot bolt 13, by means of the tiller arm 44, for making horizontal cuts.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A cart for supporting and maneuvering a saw which includes an engine and a projecting sawing unit, said cart comprising a relatively low-level, wheel supported, forwardly projecting frame, handles extending upwardly and rearwardly from the frame, a platform mounted on the frame, means adapted to mount the saw on the platform with the engine supported thereon and the sawing unit projecting forwardly therefrom, and a transverse bar fixed on the front of the frame below the sawing unit; said bar including a serrated forwardly projecting member having a laterally extending serrated portion, and a depending ground engaging flange at the back of said member and extending substantially the full length of the bar.

(References on following page)

References Cited in the file of this patent

UNITED STATES PATENTS

| | | |
|---|---|---|
| 680,251 | Hill | Aug. 13, 1901 |
| 1,054,351 | Meyer zu Jerrendorf | Feb. 25, 1913 |
| 1,518,198 | Hearne | Dec. 9, 1924 |
| 1,601,201 | Daw | Sept. 28, 1926 |
| 2,348,588 | Arsneau | May 9, 1944 |
| 2,455,369 | Kuykendall | Dec. 7, 1948 |
| 2,481,145 | Nielsen | Sept. 6, 1949 |
| 2,496,982 | Brukholder | Feb. 7, 1950 |
| 2,529,328 | Carter | Nov. 7, 1950 |
| 2,560,641 | Goodlet | July 17, 1951 |
| 2,588,953 | Bausch et al. | Mar. 11, 1952 |

FOREIGN PATENTS

| | | |
|---|---|---|
| 104,509 | Australia | July 7, 1938 |
| 118,817 | Australia | Aug. 14, 1944 |